UNITED STATES PATENT OFFICE.

JOHN COLLINS CLANCY, OF NIAGARA FALLS, NEW YORK, ASSIGNOR TO THE NITROGEN CORPORATION, OF PROVIDENCE, RHODE ISLAND, A CORPORATION OF RHODE ISLAND.

CONVERSION OF CARBON MONOXID INTO CARBON DIOXID.

1,376,514. Specification of Letters Patent. Patented May 3, 1921.

No Drawing. Application filed February 7, 1920. Serial No. 357,030.

*To all whom it may concern:*

Be it known that I, JOHN COLLINS CLANCY, a subject of the King of Great Britain, residing at Niagara Falls, in the county of Niagara and State of New York, have invented certain new and useful Improvements in Conversion of Carbon Monoxid into Carbon Dioxid, of which the following is a specification.

This invention relates to a process of converting carbon monoxid into carbon dioxid in the presence of hydrogen, and, in certain cases, of other gases in addition to hydrogen.

The principal object of my invention is to prepare a pure gaseous mixture preferably consisting of hydrogen and carbon dioxid, or hydrogen, nitrogen and carbon dioxid, to the end that when the carbon dioxid is removed, in any suitable fashion, a gas or gases adapted for the synthesis of ammonia from its elements may be obtained.

My invention also contemplates the conversion of carbon monoxid into carbon dioxid at relatively low temperatures, whereby to favor the life of the apparatus employed and to conserve energy.

These and other objects of my invention will be hereinafter referred to and the novel combinations of steps, whereby said objects may be attained will be more particularly pointed out in the claims appended hereto.

As I am aware of various changes and modifications which may be made in or to my process without departing from the spirit of my invention, I desire to be limited only by the scope of said claims, broadly interpreted in the light of my disclosure.

Various attempts to produce hydrogen, or mixtures of hydrogen with nitrogen, in condition for use in the synthesis of ammonia from its elements have been made; but on account of the extreme sensitiveness to carbon monoxid, of most of the catalysts employed in connection with the synthesis of ammonia, it has heretofore been found to be a costly and rather tedious proceeding, to produce hydrogen or hydrogen mixed with nitrogen, from such inexpensive sources of a mixture of this character as water gas.

Obviously, one of the first considerations is the cost of the pure gas to be supplied to the ammonia synthesis operation; and it has been found that where even but $\frac{1}{2}\%$ or 1% of CO, is present in the gaseous mixture, the cost of removing this small amount of carbon monoxid by absorption processes, or the like, has been so great as to almost prohibit the success of the operation.

I have discovered, however, that it is possible to so treat a gaseous mixture containing carbon monoxid in appreciable quantities, as to convert substantially all of said carbon monoxid to carbon dioxid quantitatively by a selective combustion.

A mixture of this character may be formed by passing carbon monoxid and steam over a catalyst, such as nickel, or iron, or an oxid of these metals,—at a temperature approximating 700° C.

The gaseous mixture conducted away from the catalytic chamber in such case will consist of hydrogen, carbon dioxid and carbon monoxid and the proportion of these gases will, of course, vary considerably,— depending upon the nature of the catalyst, the temperature of the operation, etc.; but, in any case, the amount of carbon monoxid present will normally be in excess of 1%.

In accordance with my process, such a gaseous mixture is then conducted into a second catalytic chamber, in which is a suitable low-temperature catalyst capable of effecting preferential combustion of the CO present into $CO_2$ and a suitable quantity of either free oxygen, or of air, is simultaneously introduced into this second chamber.

The catalyst used for this purpose may be lead chromate, or vanadium chromate; and both of these catalysts operate successfully at temperatures approximating 300° C.

Another catalyst of this description, which operates at a slightly lower temperature, is titanium oxid, $TiO_2$.

My preferred catalyst, however, is a peculiarly expanded form of copper cyanamid. This catalyst may be prepared by converting calcium cyanamid in aqueous solution, into copper cyanamid, by reacting upon the calcium cyanamid with copper chlorid; the latter also being in solution in water.

The resulting black precipitate is separated by filtration and after it has been dried, the cake formed is broken into lumps and is then heated at from 200 to 300° C. in a closed crucible or in an oil bath. The lumps of copper cyanamid pop much like popcorn during the heating process and the resultant product is an especially porous expanded mass; the structure of which appears to be wonderfully well adapted for catalytic purposes. Such an expanded catalyst as this, especially if it thus comprises carbon united to nitrogen by a plurality of bonds, will operate to successfully and practically quantitatively convert substantially all traces of CO, present in the gaseous mixture, into $CO_2$, by selective or preferential combustion. It is extremely desirable that the temperature at which this conversion of CO into $CO_2$ is effected, be relatively low; because at temperatures materially in excess of 450° C. it becomes substantially impossible to prevent some of the hydrogen from combining with the free oxygen present, in preference to the CO.

The amount of oxygen or air supplied to the mixture, entering the second catalytic chamber, as above described, will depend upon the content of CO present in the gas emerging from the first chamber. Thus, 28 parts of CO will require 16 parts of oxygen, to convert the CO completely into $CO_2$. Knowing the percentage of carbon monoxid present in the gases, it is therefore an easy matter to compute the amount of air or oxygen which must be added,—in view of this ratio.

For reasons hereinafter set forth, an excess of air or oxygen will, however, do no harm; if the mixture to be produced is to be used in the manner now to be described. If the resulting mixture has been formed by the addition of just sufficient pure oxygen, it will consist of pure hydrogen and carbon dioxid. If air is used as the source of oxygen, instead of pure oxygen, then, of course, nitrogen and a trace of argon and other rare atmospheric gases will be introduced.

Assuming that the gaseous product is a mixture of hydrogen, carbon dioxid and nitrogen,—with, of course, the small percentage of argon and the like resulting from the air used, in such mixture; then, after the removal of the $CO_2$ therefrom in any suitable manner, as, for example, by absorbing the latter in alkaline solution,—the gaseous residues may be passed through a high temperature burner, preferably after the gaseous mixture has been suitably preheated, and air may then be added thereto, to form the requisite mixture of nitrogen and hydrogen required for the ammonia synthesis process. During combustion in this burner, about one seventh part, by volume, of the hydrogen present, will be consumed in eliminating the oxygen content of the air, in the form of water. This water may be refrigerated out and any remaining traces thereof removed by suitable drying apparatus.

Having thus described my invention, what I claim is:

1. The process of converting carbon monoxid which is mixed with hydrogen and carbon dioxid,—into carbon dioxid, which comprises effecting preferential combustion of said carbon monoxid into carbon dioxid through the intermediacy of a selective catalyst which includes a cyanogen compound of copper.

2. The process of converting carbon monoxid which is mixed with hydrogen and carbon dioxid,—into carbon dioxid, which comprises effecting preferential combustion of said carbon monoxid into carbon dioxid through the intermediacy of a selective catalyst which includes an expanded porous cyanogen compound.

3. The process of converting carbon monoxid which is mixed with hydrogen and carbon dioxid,—into carbon dioxid, which comprises effecting preferential combustion of said carbon monoxid into carbon dioxid through the intermediacy of a selective catalyst which includes a porous cyanogen compound.

4. The process of converting carbon monoxid which is mixed with hydrogen and carbon dioxid,—into carbon dioxid, which comprises effecting preferential combustion of said carbon monoxid into carbon dioxid through the intermediacy of a selective catalyst which includes carbon united to nitrogen by a plurality of bonds.

5. The process of converting carbon monoxid which is mixed with hydrogen and carbon dioxid,—into carbon dioxid, which comprises effecting preferential combustion of said carbon monoxid into carbon dioxid through the intermediacy of a selective gaseously expanded catalyst capable of combining carbon monoxid with free oxygen at a temperature below 450° C. while leaving the hydrogen present substantially unacted upon by said free oxygen.

In testimony whereof I have affixed my signature, in the presence of two witnesses.

JOHN COLLINS CLANCY.

Witnesses:
 HOWARD C. RIPLEY,
 HELEN M. BARNBROOK.